United States Patent [19]

Kishi et al.

[11] Patent Number: 4,814,878
[45] Date of Patent: Mar. 21, 1989

[54] SYNC DETECTION CIRCUIT

[75] Inventors: Hiroyasu Kishi, Gumma; Hiromi Arai, Saitama, both of Japan

[73] Assignee: Sanyo Electric Co., Ltd., Osaka, Japan

[21] Appl. No.: 74,605

[22] Filed: Jul. 17, 1987

[30] Foreign Application Priority Data

Jul. 18, 1986 [JP] Japan .................................. 61-170637
Aug. 18, 1986 [JP] Japan .................................. 61-193472

[51] Int. Cl.$^4$ .......................... H04N 5/08; H04N 5/05
[52] U.S. Cl. ...................................... 358/148; 358/158
[58] Field of Search ................................. 358/148, 158

[56] References Cited

U.S. PATENT DOCUMENTS

| | | |
|---|---|---|
| 3,609,221 | 9/1971 | Langer . |
| 3,878,336 | 4/1975 | Balaban . |
| 4,025,951 | 5/1977 | Eckenbrecht ........................ 358/158 |
| 4,231,064 | 10/1980 | Uchida ................................. 358/158 |
| 4,298,890 | 11/1981 | Lai et al. ............................. 358/158 |
| 4,387,397 | 6/1983 | Dietz ................................... 358/154 |
| 4,467,359 | 8/1984 | Hosoya ................................ 358/158 |

FOREIGN PATENT DOCUMENTS 60-98971 7/1985 Japan .
2078035 12/1981 United Kingdom .
2123246 1/1984 United Kingdom .

OTHER PUBLICATIONS

'85 Semiconductor Handbook, Sanyo Electric Co., Ltd., pp. 1000-1002, 1344, 86 and 87.

Primary Examiner—John W. Shepperd
Attorney, Agent, or Firm—Armstrong, Nikaido, Marmelstein & Kubovcik

[57] ABSTRACT

A sync detection circuit detects a standard signal which is a signal having V-sync signals with a predetermined repetition period, a non-standard signal which is a signal having V-sync signals with the repetition period other than the predetermined repetition period, and a signal absent condition which occurs when the broadcasting is finished. The sync detection circuit includes a V-sync separator for separating V-sync signals, a counter for counting the predetermined repetition period in relation to each of the V-sync signals and for producing a count-up signal upon counting the predetermined repetition period, and a phase comparator for comparing the phase of the count-up signal with the phase of a V-sync signal and for producing a first level signal, representing the receipt of the standard signal, when the compared signals have the same phase, and a second level signal, representing the receipt of the nonstandard signal, when the compared signals have the different phase. The counter also counts a predetermined time period, which is greater than the predetermined repetition period, in relation to the V-sync signal and for producing a time-up signal upon counting the predetermined time period, and a condition detector for detecting the signal absent condition when no V-sync signal appears before the time-up signal is produced.

12 Claims, 4 Drawing Sheets

SYNC DETECTION CIRCUIT

BACKGROUND OF THE INVENTION

1. Field of the invention

The present invention relates to a sync detection circuit and, more particularly, to an improvement of an automatic frequency control circuit for controlling the frequency of the horizontal sync signal (also referred to as a H-sync signal).

2. Description of the Prior Art

Generally, a television receiver has a synchronous detector which detects whether or not the vertical synchronizing signal (also referred to as a V-sync signal) is generated at a predetermined frequency. Such a synchronous detector is disclosed, for example, in Japanese Utility Model Publication (unexamined) No. 98971/1985 published July 5, 1985 or in U.S. Pat. No. 3,878,336 issued Apr. 15, 1975 or in a SANYO's brochure No. 1431 for LA7620 entitled "Monolithic Linear Integrated Circuit". An example of the synchronous detector is illustrated in FIG. 1.

In FIG. 1, a video signal applied to a terminal 1 is transmitted to a sync separator 2 which separates from the video signal a V-sync signal and a H-sync signal. The V-sync signal is applied to an AND gate 9, and the H-sync signal is applied to an AFC (automatic frequency control) 3. In AFC 3, the phase of the H-sync signal from sync separator 2 is compared with that of the fly-back pulse from a horizontal deflection circuit 4, and a phase difference therebetween is applied to a voltage controlled oscillator 5. Thus, voltage controlled oscillator 5 generates a pulse signal having a frequency which is a multiple of the frequency of the H-sync signal. A horizontal frequency divider 6 divides the frequency of the pulse signal from the voltage controlled oscillator and provides a pulse signal having a H-sync frequency $f_H$ to H-deflection circuit 4, and also provides a pulse signal having a frequency $2f_H$ to a vertical frequency divider 8 at a clock input thereof and to a clock input of a D flip-flop 7.

The V-sync signal is applied to AND gate 9 which also receives a signal from a Q terminal of R-S flip-flop 10. The S-terminal of R-S flip-flop 10 receives from terminal 14 of the vertical frequency divider 8 a HIGH level signal produced during a period between 224H and 296H (H is one horizontal sync period) so that AND gate 9 connected to the Q terminal of flip-flop 10 is enabled after 224H.

Therefore, under the synchronizing condition, that is when the V-sync signal from sync separator 2 is produced after 224H, the V-sync signal will pass through the AND gate 9 and it will be applied to the D terminal of D flip-flop 7. Then, in response to the clock signal of $2f_H$ from H-frequency divider 6, D flip-flop 7 produces a reset pulse from its Q terminal which is used for resetting the V-frequency divider 8.

On the contrary, under the asynchronous condition, that is when the V-sync signal from sync separator 2 is not produced in a period between 224H and 296H, the V-frequency divider 8 will be self reset. Therefore, V-frequency divider 8 produces a HIGH level signal from terminal 15 after 296H, which is applied through OR gate 11 to the D terminal of D flip-flop 7. Therefore, D flip-flop 7 produces a reset pulse in response to the pulse from terminal 15.

As apparent from the above, under the synchronizing condition, V-frequency divider 8 will be reset by the V-sync signal obtained from sync separator 2, and under the asynchronous condition, V-frequency divider 8 will be self-reset by the pulse produced from V-frequency divider 8. When the V-frequency divider 8 is reset, it activates vertical deflection circuit 12 which thereupon produces a vertical deflection pulse.

According to the above arrangement, since R-S flip-flop 13 has its S terminal connected to terminal 15 which produces a HIGH level signal after 296H, and also has its R terminal connected to AND gate 9, R-S flip-flop 13 will be reset under the synchronizing condition and, it will be set under the asynchronous condition. Therefore, R-S flip-flop 13 detects the synchronizing and asynchronous conditions.

It is possible, for example, to use the result of the synchronizing detection for controlling the sensitivity of the AFC 3 in the following manner. When the synchronizing condition is detected, the control current of AFC 3 is reduced (it may be possible to reduce the resistance of the AFC filter). Thereupon, the sensitivity of AFC 3 will be reduced so that the noise signal will not be easily picked up. On the other hand, when the asynchronous condition is detected, the control current of AFC 3 is increased (it may be possible to increase the resistance of the AFC filter). Thereupon, the sensitivity of AFC 3 will be increased so that the response time of the AFC loop will be shortened to shorten the pull in time of the H-sync signal.

However, with such an arrangement, a problem arises during a signal absent condition which occurs when the broadcasting is finished with the television receiver being still on, or when the television receiver is switched to a non-broadcasting channel. Under such a condition, no V-sync signal will be produced from sync separator 2 and, therefore, AND gate 9 will continue to produce a LOW level signal. However, by the HIGH level signal produced from terminal 15 at 296H, R-S flip-flop 13 will be set to produce a HIGH level signal from its Q terminal indicating the asynchronous condition. Therefore, the sensitivity of AFC 3 will be undesirably increased under the signal absent condition. Thus, it may possibly happen that VCO 5 is caused to malfunction by the noise signal from sync separator 2 to oscillate at a very low frequency. In such a case, one cycle period of the pulses from H-frequency divider 6 will be prolonged to prolong the on period of the transistor. Thus, the transistor may be overloaded to emit heat. Also, in such a case, due to the frequency change of the H-sync signal, the flyback transformer may produce undesirable buzzing sound. Furthermore, the crest value of the flyback pulse may be undesirably increased thereby increasing the anode voltage of the cathode ray tube. This will result in the increase of the beam speed hitting on the cathode ray tube, thereby producing unfavorable X-rays from the cathode ray tube.

SUMMARY OF THE INVENTION

The present invention has been developed with a view to substantially solving the above described problem and has for its essential object to provide an improved sync detection circuit which may detect and produce signals indicating various conditions, such as a synchronizing condition, an asynchronous condition and a signal absent condition.

It is also an essential object of the present invention to provide an improved sync detection circuit which operates to control the AFC circuit appropriately for various conditions such as a synchronizing condition, an asynchronous condition and a signal absent condition.

In accomplishing these and other objects, a sync detection circuit according to the present invention detects a standard signal which is a signal having V-sync signals with a predetermined repetition period, a non-standard signal which is a signal having V-sync signals with the repetition period other than said predetermined repetition period, and a signal absent condition which occurs when the broadcasting is finished, or when a television receiver is switched to a non-broadcasting channel.

To this end, the sync detection circuit according to the present invention comprises a V-sync separator for separating V-sync signals, a first counter for counting the predetermined repetition period in relation to the generation of each of the V-sync signals and for producing a count-up signal upon counting the predetermined repetition period, and a phase comparator for comparing the phase of the count-up signal with the phase of a V-sync signal and for producing a first level signal, representing the receipt of the standard signal, when the compared signals have the same phase, and a second level signal, representing the receipt of the non-standard signal, when the compared signals have the different phase.

The sync detection circuit according to the present invention further comprises a second counter for counting a predetermined time period, which is greater than the predetermined repetition period, in relation to the generation of the V-sync signal and for producing a time-up signal upon counting the predetermined time period, and a condition detector, which is connected to receive the time-up signal and the V-sync signal, for detecting the signal absent condition when no V-sync signal appears before the time-up signal is produced.

According to a preferred embodiment, the condition detector produces a first level signal upon detection of the signal absent condition, and a second level signal when a V-sync signal appears before the time-up signal is produced.

Also, according to a preferred embodiment, the sync detection circuit further comprises an OR gate for receiving signals from the phase comparator and signals from the condition detector and for producing a first level signal when at least one of the phase comparator and the condition detector is producing a first level signal, an H-sync separator for separating H-sync signals, and an automatic frequency control for controlling a frequency of a horizontal deflection in accordance with a frequency of the H-sync signals. The automatic frequency control means is arranged to operate under a low sensitive mode upon receipt of a first level signal from the OR gate means, and to operate under a high sensitive mode upon receipt of a second level signal from said OR gate means.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which.

DESCRIPTION OF THE PREFERRED EMBODIMENTS

Figure 1:
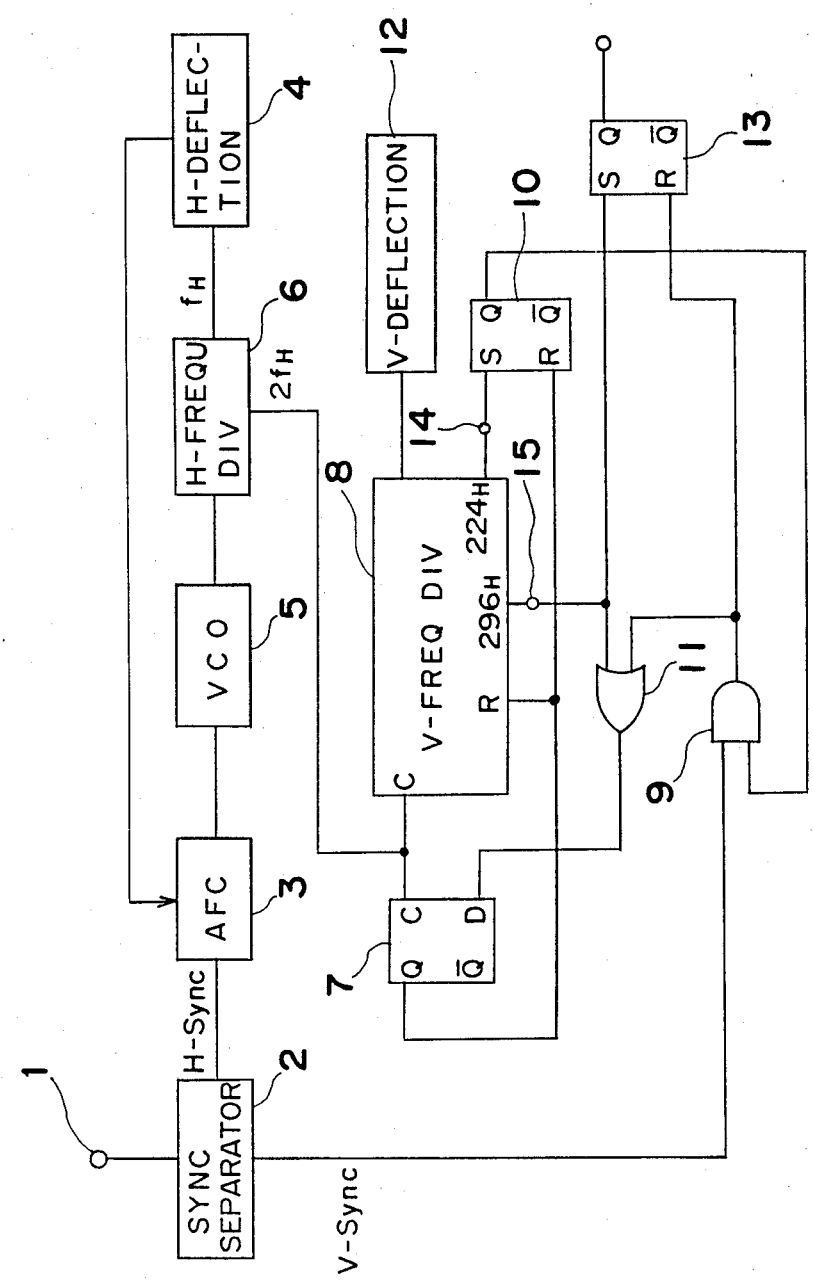
FIG. 1 is a sync detection circuit according to a prior art.
Figure 2:
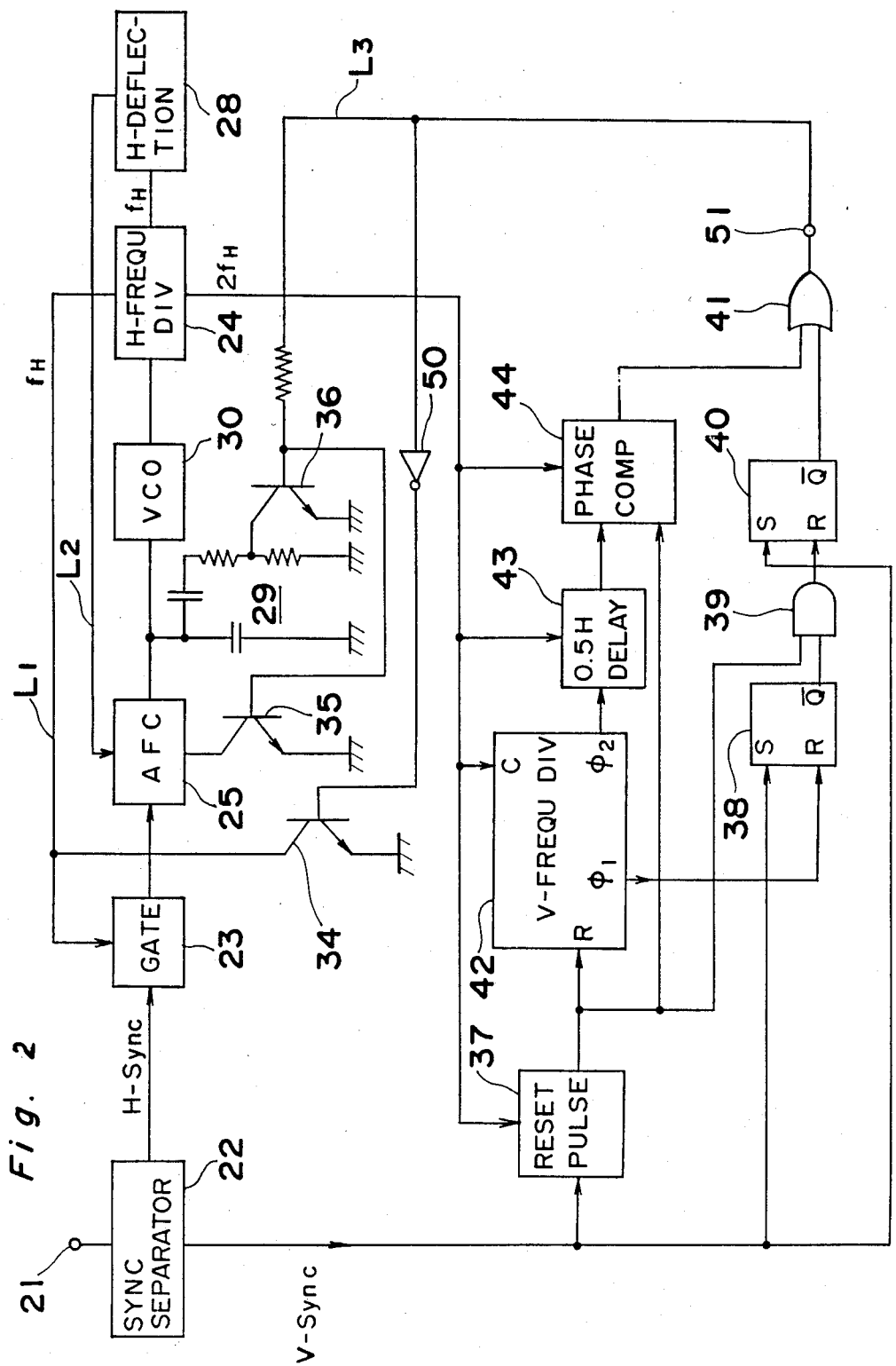
FIG. 2 is a sync detection circuit according to a preferred embodiment of the present invention.

Referring to FIG. 2, a sync detection circuit according to a preferred embodiment of the present invention is shown. The video signal applied to a terminal 21 is transmitted to a sync separator 22 which separates from the video signal a V-sync signal and a H-sync signal.

The H-sync signal is applied through a gate 23 to an AFC (automatic frequency control) 25, which is in turn connected to a VCO (voltage controlled oscillator), a horizontal frequency divider 24 and a horizontal deflection circuit 28. Gate 23 is enabled or opened by a pulse signal obtained from the horizontal frequency divider 24 through line L1 which is connected to ground through a transistor 34.

The H-sync signal passed through gate 23 is applied to AFC 25 at which the phase of the H-sync signal from sync separator 22 is compared with that of the fly-back pulse from a horizontal deflection circuit 28 through line L2, and a phase difference therebetween is applied to an integration circuit 29 at which the phase difference signal is smoothed. The smoothed phase difference signal is further applied to VCO 30. Thus, VCO 30 generates a pulse signal having a frequency which is a multiple of the frequency of the H-sync signal. In horizontal frequency divider 24, the frequency of the pulse signal from VCO 30 is divided and provides a frequency divided H-sync signal having a horizontal sync frequency $f_H$ to horizontal deflection circuit 28, and also provides a pulse signal having a frequency $2f_H$ to each of vertical frequency divider 42 at a clock input thereof, a delay 43, a phase comparator 44 and to a reset pulse generator 37. In a sense, frequency divider 24 is a counter for counting the pulses from VCO 30 and produces a pulse after a certain number of pulses from VCO 30. The pulse signal from horizontal frequency divider 24 to horizontal deflection circuit 28 and the pulse signal from horizontal frequency divider 24 to gate 23 have the same frequency $f_H$, but different phase. The detail of AFC 25 will be described later in connection with FIG. 4.

Figure 3:
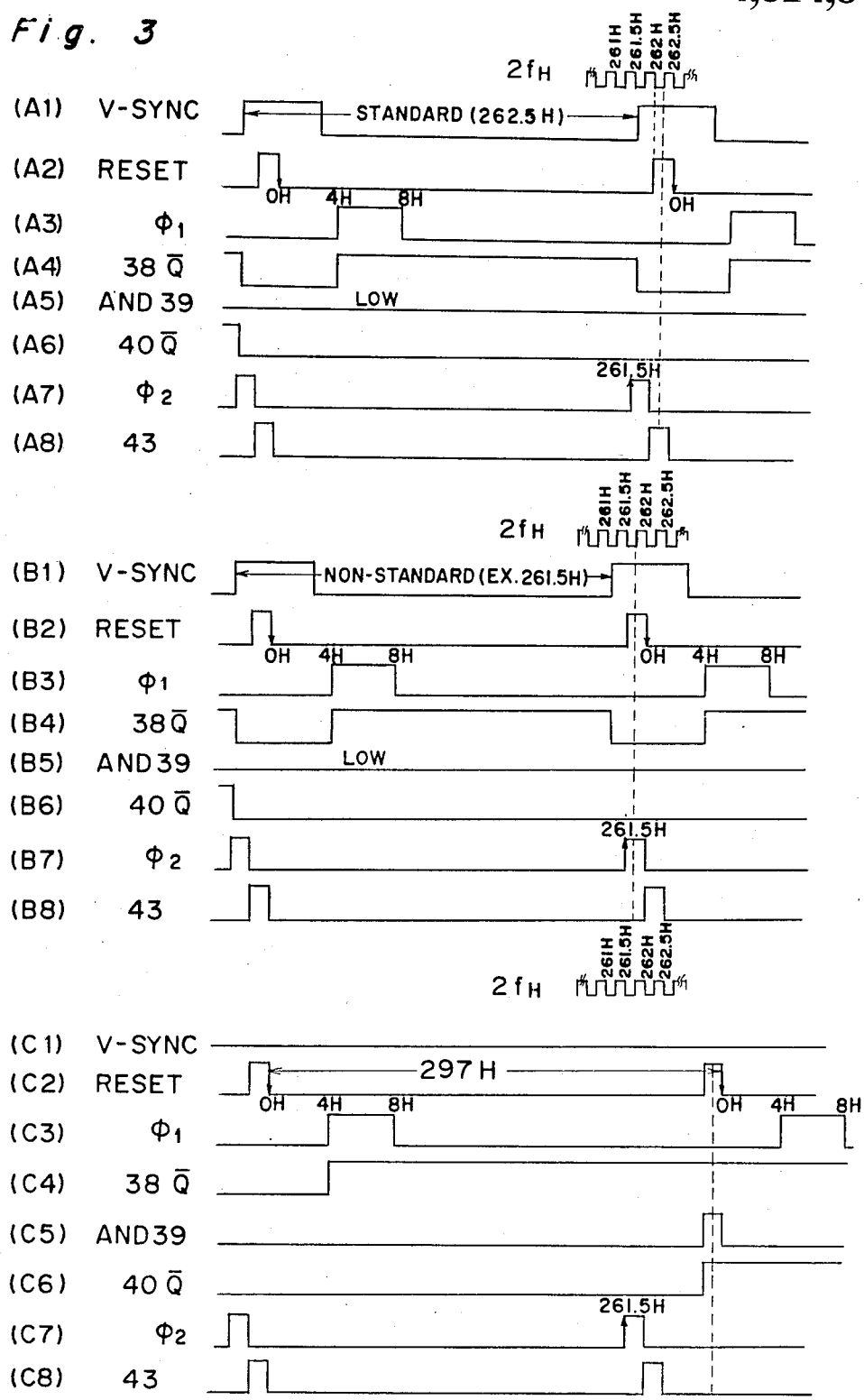
FIG. 3 is a graph showing waveforms of signals obtained at various points in the circuit of FIG. 2 in three different conditions.

The V-sync signal is applied to a reset pulse generator 37 and also to each of R-S flip-flops 38 and 40 at their S terminal. As shown in FIG. 3, waveform A2, B2 or C2, reset pulse generator 37 receives the V-sync pulse and produces a pulse having a pulse duration of 0.5H in response to the first step-down edge of the clock pulse ($2f_H$) obtained from H-frequency divider 24. The clock pulse is produced continuously, but in FIG. 3, only a portion of the clock pulse is shown. The reset pulse as produced from reset pulse generator 37 is applied to vertical frequency divider 42, phase comparator 44 and also to AND gate 39.

In a sense, frequency divider 42 is a counter for counting the pulses from frequency divider 24 and produces a pulse after a certain number of pulses from frequency divider. 24 Vertical frequency divider 42 starts to count the clock pulse in response to the step-down edge of the reset pulse and produces a pulse $\phi 1$ which steps up at 4H and steps down at 8H (FIG. 3, waveforms A3, B3 and C3), and a pulse $\phi 2$ which steps up at 261.5H and steps down at 262H (FIG. 3, waveforms A7, B7 and C7). A detail of vertical frequency divider 42 is disclosed in detail in our U.S. patent application (Ser. No. 063,949) filed June 19, 1987 and entitled "Vertical Driving Pulse Generating Circuit".

The pulse $\phi1$ is applied to the R-terminal of R-S flip-flop 38 so that $\overline{Q}$ terminal of flip-flop 38 produces a LOW level signal in response to the step-up of V-sync signal and produces a HIGH level signal in response to the step-up of the pulse $\phi1$. AND gate 39 receives the reset pulse and the signal from the $\overline{Q}$ terminal of flip-flop 38, and the output thereof is applied to the R-terminal of R-S flip-flop 40. The $\overline{Q}$ terminal of flip-flop 40 is applied to an OR gate 41. A circuit defined by flip-flops 38 and 40 and AND gate 39 is a detector for detecting the signal absent condition which occurs when the broadcasting is finished, or when the television receiver is switched to a non-broadcasting channel, as explained below.

Under the signal absent condition, reset pulse generator 37 produces by itself a reset pulse after determining 297H from the step-down of the previous reset pulse (FIG. 3, waveform C2). In the meantime, since there is no V-sync pulse, R-S flip-flops 38 and 40 will not be set. In fact, as long as no V-sync signal is produced, flip-flop 38 receives only the reset pulse $\phi1$ from frequency divider 42 and therefore, $\overline{Q}$ terminal thereof continues to produce a HIGH level signal (FIG. 3 waveform C4) thereby enabling AND gate 39, and also, flip-flop 40 receives only the reset pulse from AND gate 39 in response to the reset pulse. Therefore, under the signal absent condition, R-S flip-flop 40 produces a HIGH level signal from its $\overline{Q}$ terminal (FIG. 3 waveform C6). If any V-sync signal is present, R-S flip-flop 40 will be set and, therefore, R-S flip-flop 40 produces a LOW level signal from its $\overline{Q}$ terminal (FIG. 3 waveform A6 or B6).

The pulse $\phi2$ is delayed by 0.5H in a delay 43 and is applied to a phase comparator 44 at which the phase of the delayed pulse $\phi2$ is compared with the phase of the reset pulse from reset pulse generator 37. The result of the comparison is used for detecting whether or not the signal applied to terminal 21 is a standard signal, having V-sync signals with the repetition period of 262.5H, or a non-standard signal, having V-sync signals with the repetition period other than 262.5H. The standard and nonstandard signals are further explained hereinbelow.

As understood to those skilled in the art, under the NTSC system, the V-sync signals contained in the television signal from the television broadcasting station or the V-sync signals contained in the television signal in the video tape reproduced under the normal replay mode have the repetition period of 262.5H. On the contrary, the V-sync signals contained in the television signal in the video tape reproduced under a special replay mode e.g., a fast speed replay mode or a still picture replay mode, or the V-sync signals contained in the video signal transmitted from a personal computer or a similar device have the repetition period other than 262.5H. Therefore, of the signals applied to terminal 21, the signal having V-sync signals with the repetition period of 262.5H is referred to as a standard signal (FIG. 3, waveform A1), and the signal having V-sync signals with the repetition period other than 262.5H is referred to as a non-standard signal (FIG. 3, waveform B1 or C1).

In FIG. 3, waveforms A1-A8 represent a case when the standard signal is applied to terminal 21. In this case, the reset pulses (A2) are produced in relation to the V-sync pulses (A1) so that the repetition period thereof is 262.5H. Thus, the time interval between the step-down edges of the reset pulses is 262.5H, and it is at such step-down edges where frequency divider 42 is reset and starts to count up from OH. In the meantime, V-frequency divider 42 produces pulses $\phi2$ (A7) after counting 261.5H from the step-down of the reset pulse. Therefore, 0.5H delayed pulse $\phi2$ (A8) is produced at the same phase as that of the reset pulse (A2). Since both pulses have the pulse duration of 0.5H, the phase comparison is carried out in response to the step-up edge of the clock pulse from frequency divider 24. Accordingly, when the standard signal is receiving, the reset pulse (A2) and the delayed pulse $\phi2$ (A8) have the same phase. In this case, phase comparator 44 is so arranged to produces a HIGH level signal representing the standard signal, at least until the next comparison is carried out.

In FIG. 3, waveforms B1-B8 represent a case when the non-standard signal having a repetition period of 261.5H is applied to terminal 21. In this case, the reset pulses (B2) are produced in relation to the V-sync pulses (B1) so that the repetition period thereof is 261.5H. Thus, the time interval between the step-down edges of the reset pulses is 261.5H. In the meantime, V-frequency divider 42 produces pulses $\phi2$ (B7) after counting 261.5H from the step-down of the reset pulse. Therefore, 0.5H delayed pulse $\phi2$ (B8) is produced after the reset pulse. Accordingly, when the non-standard signal is receiving, the reset pulse (B2) and the delayed pulse $\phi2$ (B8) have a different phase. In this case, phase comparator 44 is so arranged as to produces a LOW level signal representing the non-standard signal, at least until the next comparison is carried out.

Therefore, from the foregoing description, OR gate 41 produces a HIGH level signal when the sync separator 22 is receiving a standard signal or during the signal absent condition, and OR gate 41 produces a LOW level signal when the sync separator 22 is receiving a non-standard signal.

The HIGH or LOW level signal produced from OR gate 41 is transmitted through line L3 to a transistor 35 to control the sensitivity of AFC 25, to a transistor 36 to control the response time of integrator 29, and also through an inverter 50 to a transistor 34 to control gate 23.

Figure 4:
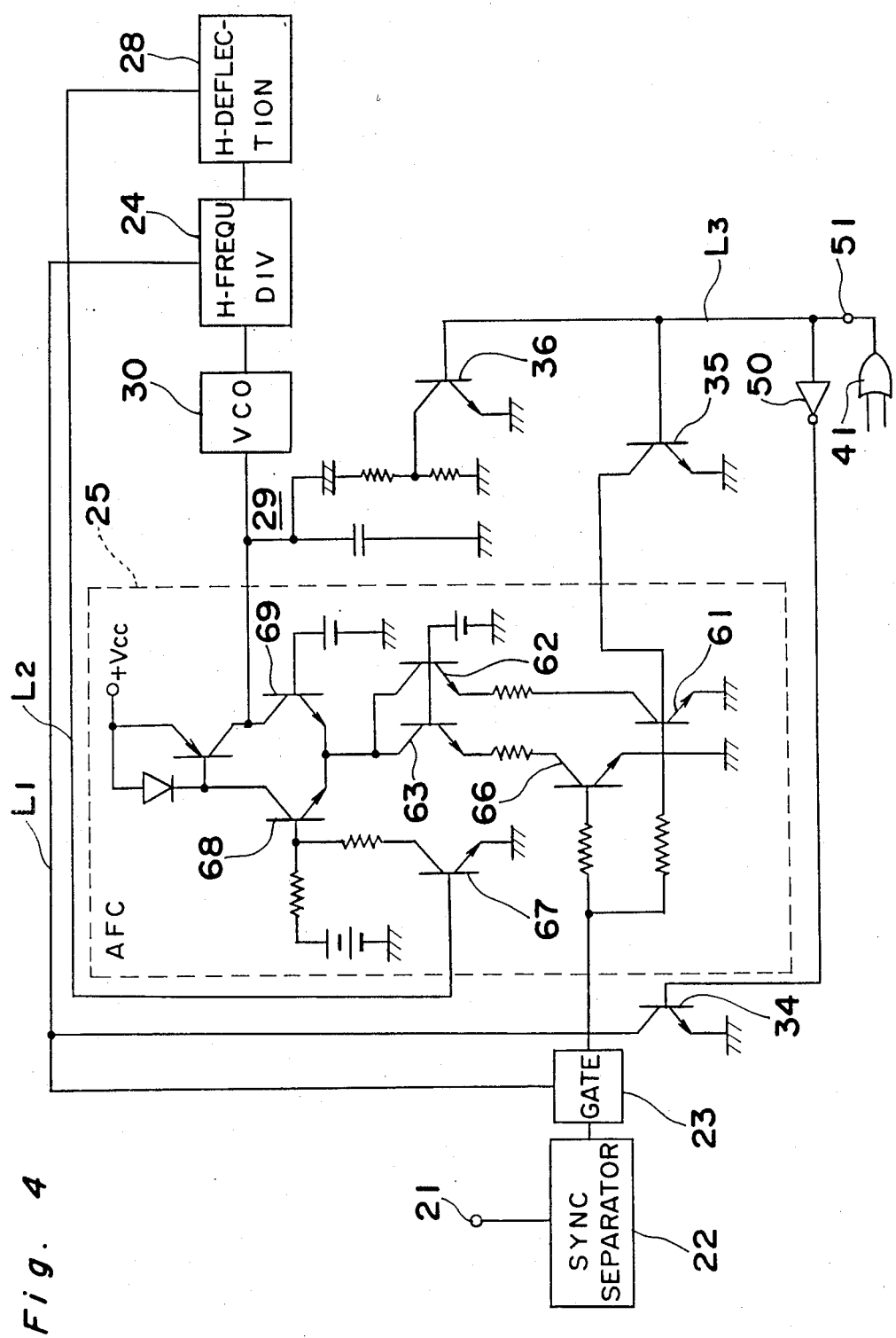
FIG. 4 is a circuit diagram showing a detail of the AFC circuit employed in the circuit of FIG. 3.

Referring now to FIG. 4, a detail of AFC 25 is shown which includes transistors 61 and 66 for receiving the H-sync signal from sync separator 22 through gate 23, a transistor 67 for receiving the fly-back pulse from the horizontal deflection circuit 28, and transistors 68 and 69 for producing, from the collector or transistor 69, a signal representing a phase difference between the H-sync signal from gate 23 and the fly-back pulse from the horizontal deflection circuit 28. AFC 25 further includes transistors 62 and 63 having collectors thereof connected to each other and further connected to emitters of transistors 68 and 69. The base of transistor 61 is connected to transistor 35.

When transistor 35 turns on as caused by a HIGH level signal supplied along line L3, transistor 61 turns off and transistor 62 also turns off. Thus, the emitter current from transistors 68 and 69 flows only through transistor 63. Therefore, the signal obtained from the collector of transistor 69 is somewhat small in level, thereby reducing the sensitivity of AFC 25.

The operation of circuit of FIG. 4 will be described herein below under two different situations: the first situation is when OR gate 41 is producing a LOW level signal along line L3 as a result of receiving the nonstandard signal; and the second situation is when OR gate 41 is producing a HIGH level signal as a result of receiving a standard signal or as a result of the detection of the signal absent condition.

In the first situation receiving the non-standard signal, a LOW level signal is supplied along line L3 to turn transistor 35 off. Thus, transistor 61 turns on and transistor 62 also turns on. Accordingly, a large amount of emitter current form transistors 68 and 69 may flows through both transistors 62 and 63. Therefore, the signal obtained from the collector of transistor 69 has a relatively large amount, thereby increasing the sensitivity of AFC 25.

The signal from transistor 69 is fed to integrator 29 so that the signal is smoothed at a rate determined by the time constant of the integrator 29 which is controlled by the resistance of the resistor connected across the capacitor. Since transistor 36 is now turned off by the LOW level signal from line L3, the resistance in the integrator 29 becomes great to shorten the integration time. Thus, the response time is made short to immediately follow the output change from AFC 25.

Furthermore, under the first situation, transistor 34 is turned on, so as to continuously open gate 23. Therefore, H-sync signals with their phases shifted from sync separator 22 can be transmitted to AFC 25 without failure.

The above setting acquired under the first situation is preferred, because when the non-standard signals are receiving, the repetition periods of the V-sync signal and the H-sync signal, as well as the amplitude thereof, may often vary. Therefore, under the first situation, AFC 25 is made sensitive to catch H-sync signals produced at unexpected time and even the weak sync signals. Also the response time of integrator 29 is made short to quickly follow the change in the repetition periods, i.e., to shorten the pull in time of the H-sync signal. Thus, the skew, which may occur during the special replay mode, can be eliminated.

In the second situation receiving a standard signal or detecting the signal absent condition, a HIGH level signal is supplied along line L3 to turn transistor 35 on. Thus, transistor 61 turns off and transistor 62 also turns off. Accordingly, a small amount of emitter current form transistors 68 and 69 may flows through only transistor 63. Therefore, the signal obtained from the collector of transistor 69 has a relatively small amount, thereby decreasing the sensitivity of FC 25.

The signal from transistor 69 is fed to integrator 29. Since transistor 36 in integrator 29 is now turned on by the HIGH level signal from line L3, the resistance in the integrator 29 becomes small to elongate the integration time. Thus, the response time is made long to gradually follow the output change from AFC 25.

Furthermore, under the second situation, transistor 34 is turned off, so as to intermittently open gate 23 by the pulses from horizontal frequency divider along line L1 to permit only the H-sync signals produced at the predetermined repetition period (1H) to pass through gate 23. Therefore, noise signals produced during the H-sync signal intervals from sync separator 22 can be blocked by gate 23.

The above setting under the second situation is preferred, because when the standard signals are receiving, the repetition periods of the V-sync signal and the H-sync signal, as well as the amplitude thereof, may not vary. Therefore, under the second situation, AFC 25 is made less sensitive to catch only the expected sync signals that comes periodically with a high preciseness, and also the response time of integrator 29 is made long to prevent the repetition period (262.5H) from being changed easily, thereby preventing any error operation of the circuit caused by the noise signal.

Furthermore, the above setting under the second situation is preferred, because when the signal absent condition is detected, AFC 25 is made less sensitive to catch as less noise signal (such as a white noise signal or a pulsating noise signal) as possible, or otherwise the oscillation frequency of VCO 30 may become unstable, or unwanted flyback pulses may be generated by the noise signal.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. A sync detection circuit for detecting a standard signal which is a signal having V-sync signals with a predetermined repetition period, a non-standard signal which is a signal having V-sync signals with a repetition period other than said predetermined repetition period, and a signal absent condition which occurs when the broadcasting is finished, or when a television receiver is switched to a non-broadcasting channel, said sync detection circuit comprising:

V-sync separation means for separating V-sync signals;

first counter means for counting said predetermined repetition period in relation to the generation of each said V-sync signal and for producing a count-up signal upon counting said predetermined repetition period;

phase comparing means for comparing the phase of said count-up signal with the phase of a V-sync signal and for producing a first level signal, representing the receipt of said standard signal, when the compared signals have the same phase, and a second level signal, representing the receipt of said non-standard signal, when the compared signals have different phase;

V-sync signal detecting means for receiving said V-sync signals directly from said V-sync separation means, for detecting said signal absent condition and for producing a first level signal upon detection of said signal absent condition.

2. A sync detection circuit as claimed in claim 1, further comprising OR gate means for receiving signals from said phase comparing means and signals from said V-sync signal detecting means and for taking a logic OR between said signals, thereby producing a first level signal when at least one of said phase comparing means and said V-sync detecing means is producing a first level signal.

3. A sync detection circuit as claimed in claim 2, further comprising:

H-sync separation means for separating H-sync signals; and automatic frequency control means for controlling a frequency of a horizontal deflection in accordance with a frequency of said H-sync signals, said automatic frequency control means being arranged to reduce the sensitivity thereof upon receipt of a first level signal from said OR gate means.

4. A sync detection circuit as claimed in claim 2, wherein said V-sync signal detecting means comprises:

second counter means for counting a predetermined time period, which is greater than said predetermined repetition period, in relation to the generation of said V-sync signal and for producing a time-up signal upon counting said predetermined time period; and condition detecting means, which is connected to receive said time-up signal and said V-sync signal, for detecting said signal absent condition when no V-sync signal appears before said time-up signal is produced.

5. A sync detection circuit for detecting a standard signal which is a signal having V-sync signals with a predetermined repetition period, a non-standard signal which is a signal having V-sync signals with a repetition period other than said predetermined repetition period, and a signal absent condition which occurs when the broadcasting is finished, or when a television receiver is switched to a non-broadcasting channel, said sync detection circuit comprising:

V-sync separation means for separating V-sync signals;

first counter means for counting said predetermined repetition period in relation to the generation of each said V-sync signal and for producing a count-up signal upon counting said predetermined repetition period;

phase comparing means for comparing the phase of said count-up signal with the phase of a v-sync signal and for producing a first level signal, representing the receipt of said standard signal, when the compared signals have the same phase, and a second level signal, representing the receipt of said non-standard signal, when the compared signals have different phase;

second counter means for counting a predetermined time period, which is greater than said predetermined repetition period, in relation to the generation of said v-sync signal supplied directly from said V-sync separation means and for producing a time-up signal upon counting said predetermined time period; and condition detecting means, which is connected to receive said time-up signal and said V-sync signal supplied directly from said V-sync separation means, for detecting said signal absent condition when no V-sync signal appears before said time-up signal is produced.

6. A sync detection circuit as claimed in claim 5, wherein said condition detecting means produces a first level signal upon detection of said signal absent condition, and a second level signal when a V-sync signal appears before said time-up signal is produced.

7. A sync detection circuit as claimed in claim 6, further comprising:

OR gate means for receiving signals from said phase comparing means and signals from said condition detecting means and for producing a first level signal when at least one of said phase comparing means and said condition detecting means is producing a first level signal;

H-sync separation means for separating H-sync signals; and automatic frequency control means for controlling a frequency of a horizontal deflection in accordance with a frequency of said H-sync signals, said automatic frequency control means being arranged to operate under a low sensitive mode upon receipt of a first level signal from said OR gate means, and o operate under a high sensitive mode upon receipt of a second level signal from said OR gate means.

8. A sync detection circuit for detecting a standard signal which is a signal having V-sync signals with a predetermined repetition period, a non-standard signal which is a signal having V-sync signals with a repetition period other than said predetermined repetition period, said sync detecting circuit comprising;

V-sync separation means for separating v-sync signals;

first counter means for counting said predetermined repetition period in relation to the generation of each said V-sync signal and for producing a count-up signal upon counting said predetermined repetition period;

phase comparing means for comparing the phase of said count-up signal with the phase of a v-sync signal and for producing a first level signal, representing the receipt of said standard signal, when the compared signals have the same phase, and a second level signal, representing the receipt of said non-standard signal, when the compared signals have different phase;

H-sync separation means for separating H-sync signals; and automatic frequency control means for controlling a frequency of horizontal deflection in accordance with a frequency of said H-sync signals, said automatic frequency control means being arranged to operate under a low sensitive mode upon receipt of said first level signal from said phase comparing means, and to operation under a high sensitive mode upon receipt of second level signal from said phase comparing means.

9. A sync detection circuit for detecting a standard signal which is a signal having V-sync signals with a predetermined repetition period, a non-standard signal which is a signal having V-sync signals with a repetition period other than said predetermined repetition period, and a signal absent condition which occurs when the broadcasting is finished, or when a television receiver is switched to a non-broadcasting channel, said sync detection circuit comprising:

V-sync separation means for separating V-sync signals;

first counter means for counting said predetermined repetition period in relation to the generation of each said V-sync signal and for producing a count-up signal upon counting said predetermined repetition period;

phase comparing means for comparing the phase of said count-up signal with the phase of a V-sync signal and for producing a first level signal, representing the receipt of said standard signal, when the compared signals have the same phase, and a second level signal, representing the receipt of said non-standard signal, when the compared signals have different phase;

V-sync signal detecting means for detecting said signal absent condition and for producing a first level signal upon detection of said signal absent condition; and OR gate means for receiving signals from said phase comparing means and signals from said V-sync signal detecting means and for taking a logic OR between said signals, thereby producing a first level signal when at least one of said phase comparing means and said V-sync detecting means is producing a first level signal.

10. A sync detection circuit as claimed in claim 9, further comprising:

H-sync separation means for separating H-sync signals; and automatic frequency control means for controlling a frequency of a horizontal deflection in accordance with a frequency of said H-sync signals, said automatic frequency control means being arranged to reduce the sensitivity thereof upon receipt of a first level signal from said OR gate means.

11. A sync detection circuit as claimed in claim 9, wherein said V-sync detecting means comprises:

second counter means for counting a predetermined time period, which is greater than said predetermined repetition period, in relation to the generation of said V-sync signal and for producing a time-up signal upon counting said predetermined time period; and condition detecting means, which is connected to receive said time-up signal and said V-sync signal, for detecting said signal absent condition when no V-sync signal appears before said time-up signal is produced.

12. A sync detection circuit for detecting a standard signal which is a signal having V-sync signals with a predetermined repetition period, a non-standard signal which is a signal having V-sync signals with a repetition period other than said predetermined repetition period, and a signal absent condition which occurs when the broadcasting is finished, or when a television receiver is switched to a non-broadcasting channel, said sync detection circuit comprising:

V-sync separation means for separating V-sync signals;

first counter means for counting said predetermined repetition period in relation to the generation of each said V-sync signal and for producing a count-up signal upon counting said predetermined repetition period;

phase comparing means for comparing the phase of said count-up signal with the phase of a V-sync signal and for producing a first level signal, representing the receipt of said standard signal, when the compared signals have the same phase, and a second level signal, representing the receipt of said non-standard signal, when the compared signals have different phase;

second counter means for counting a predetermined time period, which is greater than said predetermined repetition period, in relation to the generation of said V-sync signal and for producing a time-up signal upon counting said predetermined time period;

condition detecting means, which is connected receive said time-up signal and said V-sync signal, for detecting said absent condition when no V-sync signal appears before said time-up signal is produced, said condition detecting means producing a first level signal upon detection of said signal absent condition, and a second level signal when a v-sync signal appears before said time-up signal is produced;

OR gate means for receiving signals from said phase comparing means and signals from said condition detecting means and for producing a first level signal when at least one of said phase comparing means and said condition detecting means is producing said first level signal;

H-sync separation means for separating H-sync signals; and for controlling automatic frequency control means for controlling a frequency of a horizontal deflection in accordance with a frequency of said H-sync signals, said automatic frequency control means being arranged to operate under a low sensitive mode upon receipt of said first level signal from said OR gate means and to operate under a high sensitive mode upon receipt of a second level signal from said OR gate means.

* * * * *